(12) United States Patent
Waskiewicz et al.

(10) Patent No.: US 12,366,462 B2
(45) Date of Patent: Jul. 22, 2025

(54) VALIDATING HIGH DEFINITION MAPPING DATA

(71) Applicant: Argo AI, LLC, Pittsburgh, PA (US)

(72) Inventors: Ryan Waskiewicz, Pittsburgh, PA (US); Brad Krupa, Pittsburgh, PA (US); Mark Theodore Tomczak, Pittsburgh, PA (US); Daniel Scott Fitzpatrick, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 406 days.

(21) Appl. No.: 17/576,545

(22) Filed: Jan. 14, 2022

(65) Prior Publication Data

US 2023/0228594 A1 Jul. 20, 2023

(51) Int. Cl.
*G01C 21/00* (2006.01)
*B60W 60/00* (2020.01)

(52) U.S. Cl.
CPC ......... *G01C 21/387* (2020.08); *B60W 60/001* (2020.02); *G01C 21/3837* (2020.08); *G01C 21/3896* (2020.08)

(58) Field of Classification Search
CPC ............... G01C 21/387; G01C 21/3837; G01C 21/3896; G01C 21/3804; B60W 60/001
See application file for complete search history.

(56) References Cited

U.S. PATENT DOCUMENTS

| | | | |
|---|---|---|---|
| 9,514,378 B2 | 12/2016 | Armstrong-Crews et al. | |
| 10,054,678 B2 | 8/2018 | Mei et al. | |
| 10,200,877 B1 * | 2/2019 | Skidmore | H04W 16/22 |
| 10,220,766 B2 | 3/2019 | Soehner et al. | |
| 10,416,679 B2 | 9/2019 | Lipson et al. | |
| 10,445,599 B1 | 10/2019 | Hicks | |
| 2006/0047420 A1 | 3/2006 | Tanaka | |
| 2017/0248693 A1 | 8/2017 | Kim | |
| 2018/0157269 A1 | 7/2018 | Prasad et al. | |
| 2018/0284779 A1 | 10/2018 | Nix | |
| 2018/0299534 A1 | 10/2018 | LaChapelle et al. | |
| 2019/0129009 A1 | 5/2019 | Eichenholz et al. | |
| 2019/0390965 A1 | 12/2019 | Jiao et al. | |

(Continued)

FOREIGN PATENT DOCUMENTS

| | | | | |
|---|---|---|---|---|
| CN | 111272190 B | * | 4/2023 | ......... G01C 21/3632 |
| EP | 3349146 A1 | | 7/2018 | |

(Continued)

OTHER PUBLICATIONS

Machine Translation. (Year: 2020).*

(Continued)

*Primary Examiner* — Scott A Browne
*Assistant Examiner* — Lidia Kwiatkowska
(74) *Attorney, Agent, or Firm* — Sterne, Kessler, Goldstein & Fox P.L.L.C.

(57) ABSTRACT

Disclosed herein are system and method embodiments to implement a validation of a vector map. The validation process may merge proposed and persisted high-definition mapping data, evaluate the high-definition mapping data with a set of customizable validation rules, return/persist validation results, and provide a means to acknowledge validation failures to minimize creation of problematic vector map content.

14 Claims, 11 Drawing Sheets

(56) References Cited

U.S. PATENT DOCUMENTS

| | | | |
|---|---|---|---|
| 2020/0159244 A1 | 5/2020 | Chen et al. | |
| 2021/0108926 A1* | 4/2021 | Tran | G06T 17/05 |
| 2021/0157316 A1* | 5/2021 | Liu | G05D 1/0276 |
| 2021/0356277 A1* | 11/2021 | Fok | G06Q 10/067 |
| 2022/0057231 A1 | 2/2022 | Ma et al. | |
| 2022/0341750 A1* | 10/2022 | Akbarzadeh | G01C 21/3841 |

FOREIGN PATENT DOCUMENTS

| | | |
|---|---|---|
| EP | 3396408 A1 | 10/2018 |
| KR | 10-2021-0153696 A | 12/2021 |
| WO | WO 2020-023358 A1 | 1/2020 |
| WO | WO 2010/027795 A1 | 3/2020 |

OTHER PUBLICATIONS

International Search Report and Written Opinion of the International Searching Authority directed to related International Patent Application No. PCT/US2023/060556, mailed May 9, 2023; 8 pages.

\* cited by examiner

VALIDATING HIGH DEFINITION MAPPING DATA

BACKGROUND

During vector map entity creation, a series of programmatic checks may occur against new and pre-existing vector map content. However, these checks are largely unenforced today, leading to a generation of published maps with content of potentially undesirable quality. Lacking is a comprehensive solution to process content that violates vector map policies.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTIONS

Figure 1:
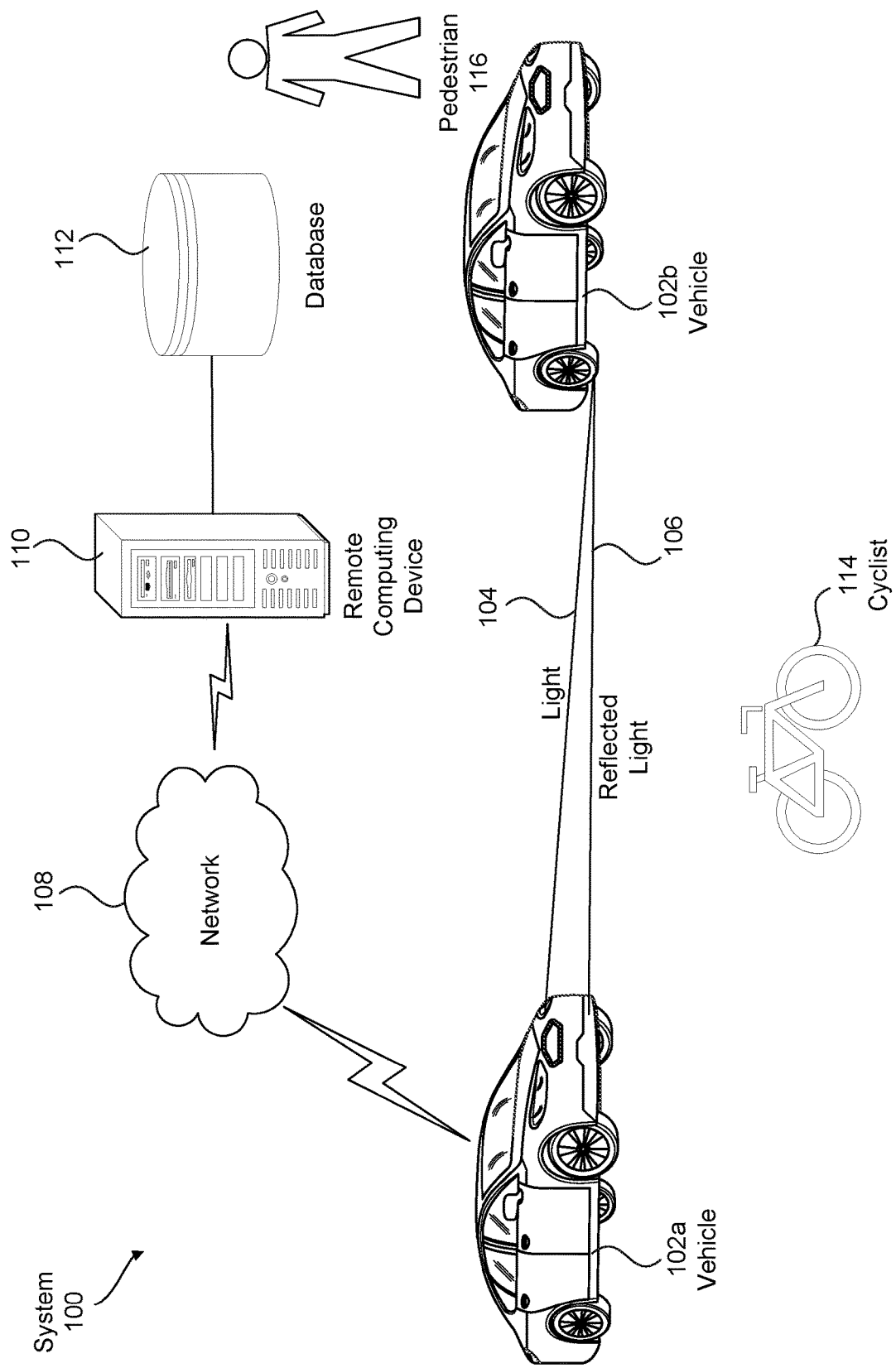
FIG. 1 illustrates an exemplary autonomous vehicle system, in accordance with aspects of the disclosure.

Provided herein are system, apparatus, device, method and/or computer program product embodiments, and/or combinations and sub-combinations thereof, using computer systems and computer-implemented methods for validating consistency and accuracy of high-definition mapping data, such as vector maps. In some embodiments, the validation process may merge proposed and persisted high-definition mapping data, evaluate the high-definition mapping data with a set of customizable validation rules, return/persist validation results, and providing a means to acknowledge validation failures to minimize creation of problematic vector map content.

A Vector MAP (VMAP) is a vector-based collection of Geographic Information System (GIS) data about Earth at various levels of detail. Features and data attributes are typically tagged. The features may include, but are not limited to, major road networks, railroad networks, hydrologic drainage systems, utility networks (cross-country pipelines and communication lines), major airports, elevation contours, coastlines, boundaries, populated places and geographical names.

In some embodiments, the technology described herein may generate a vector map policy document that outlines a set of principles/expectations that vector map content should adhere to. These expectations are defined by consumers of the map in collaboration with map engineering and map operations and are often expressed as programmatic checks. These checks are largely unenforced today, leading to a generation of published maps with content of potentially undesirable quality. In order to enforce these policies, several aspects of the current vector map content creation workflow may be taken into account to ensure minimal disruptions to creation workflows, while maximizing the correctness of the content that is created. In addition, the technology described herein may account for pre-existing content that violates current checks in place.

In some embodiments, the technology described herein may process instances of vector map applications (apps) that rely on a framework for running a standardized set of automated validations on a map to detect deviations from vector map policy. These automatically-detected validation failures may automate a "sanity-check" for a subset of a vector map that previously was performed manually. Providing a schema for tracking an intentional override of these sanity checks that (alongside annotations) can be used to holistically understand the "health" of the vector map before it is used in an autonomous vehicle (AV). Validation failures and acknowledgments may be generated and maintained by an interaction of the vector map apps themselves (using code from common libraries) and validation failure and validation failure acknowledgment for content, such as, vector map objects (VMOs) stored in the map itself.

In some embodiments, the technology described herein circumvents problems associated with validating a vector map using a rules-based review architecture. The technology described herein outlines a system configured to consider various mapping errors, such as, but not limited to, geometry, Metadata, traffic control measures, image rendering, etc. Programmatic enforcement of these validations, in some embodiments, may include a system that is capable of adequately expressing non-passing validations to both users (e.g., via application UI and user guides) and backend services. The system may, in some embodiments, consider pre-existing content that may have previously overlooked these vector map violations.

In some embodiments, the technology described herein prevents users from creating or otherwise modifying vector map content that would cause a validation to fail. In a non-limiting example, while an operator performs vector map content manipulation, validations run in the background. Should a validation failure occur, the user can be notified via the application's user interface (UI). For each validation failure, the user may rectify the violation by modifying the vector map or programmatically acknowledge the violation. Acknowledging a failed validation is the act in which an operator explicitly denotes a validation failure is acceptable to be a part of a published map. These acknowledgments serve two purposes: to provide a paper trail of acknowledgments of modifications to the map that violate said validations and allow for the continuation of vector map content/creation in cases where validations fail to acknowledge certain cases that are discovered in the world as the map is expanded As will be described in FIGS. 1-3, mobile lidar or mobile laser scanning is when one or more scanners are attached to a moving vehicle to collect data along a path. These scanners may be paired with other kinds of equipment, including Global Navigation Satellite System (GNSS) receivers and Inertial Measurement Units (IMUs). One example application is mapping streets, where power lines, exact bridge heights, bordering trees, etc. all need to be taken into account. Instead of collecting each of these measurements individually in the field, in some embodiments, a 3-D model from a point cloud may be created where all of the measurements needed can be made, depending on the quality of the data collected. This eliminates the problem of missing a measurement, so long as the model is available, reliable and has an appropriate level of accuracy.

Lidar mapping involves a process of occupancy grid map generation. The process involves an array of cells divided into grids, which employ a process to store the height values when lidar data falls into the respective grid cell. A binary map is then created by applying a particular threshold to the cell values for further processing. The next step is to process the radial distance and z-coordinates from each scan to identify which 3-D points correspond to each of the specified grid cells leading to the process of data formation.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116. When such a detection is made, AV 102a performs operations to generate one or more possible object trajectories for the detected object and analyze at least one of the generated possible object trajectories to determine whether or not there is an undesirable probability that a collision will occur between the AV and object in a threshold period of time (e.g., 1 minute). If so, the AV 102a performs operations to determine whether the collision can be avoided if a given vehicle trajectory is followed by the AV 102a and any one of a plurality of dynamically generated emergency maneuvers is performed in pre-defined time period (e.g., N milliseconds). If the collision can be avoided, then the AV 102a takes no action or optionally performs a cautious maneuver (e.g., mildly slows down). In contrast, if the collision cannot be avoided, then the AV 102a immediately takes an emergency maneuver (e.g., brakes and/or changes direction of travel). Other approaches to collision detection and avoidance by AV 102a are contemplated by this disclosure as would be understood by one skilled in the relevant art.

Figure 2:
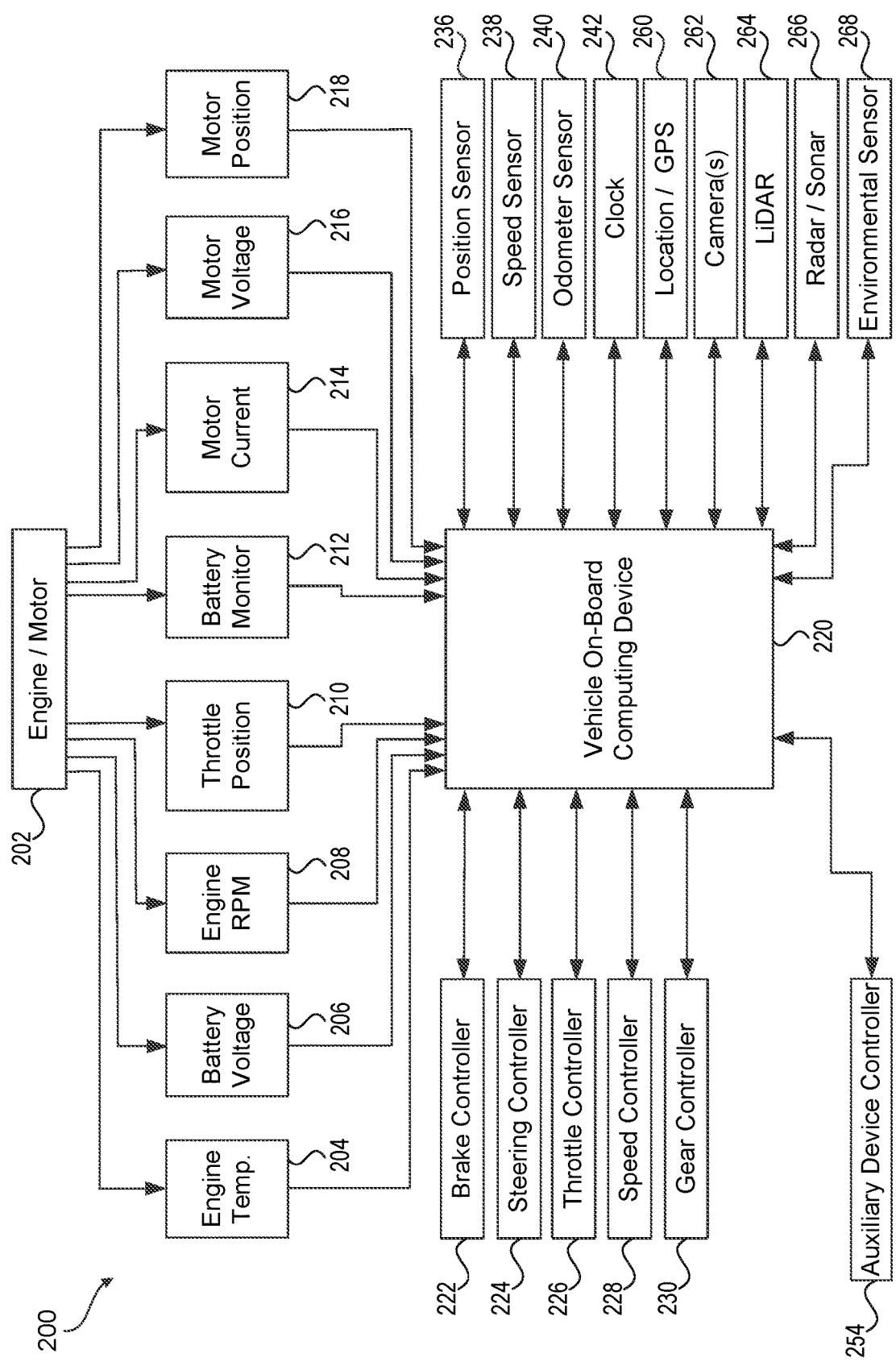
FIG. 2 illustrates an exemplary architecture for a vehicle, in accordance with aspects of the disclosure.

As will be described in greater detail in association with FIG. 3, AV 102a may be configured with a lidar system 300. Lidar system 300 may include a light emitter system 304 (transmitter) that transmits a light pulse 104 to detect objects located within a distance or range of distances of AV 102a. Light pulse 104 may be incident on one or more objects (e.g., AV 102b) and be reflected back to lidar system 300. Reflected light pulse 106 incident on light detector 308 is processed by lidar system 300 to determine a distance of that object to AV 102a. Light detector 308 may, in some embodiments, contain a photodetector or array of photodetectors positioned and configured to receive the light reflected back into the system. Lidar information, such as detected object data, is communicated from lidar system 300 to an on-board computing device 220 (FIG. 2). AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example, a position sensor 236 (e.g., an accelerometer, gyroscope and/or inertial measurement unit), a speed sensor 238 and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

When the vehicle on-board computing device 220 detects a moving object, the vehicle on-board computing device 220 generates one or more possible object trajectories for the detected object, and analyze the possible object trajectories to assess the probability of a collision between the object and the AV. If the probability exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the vehicle on-board computing device 220 may cause the vehicle 200 to perform a cautious maneuver (e.g., mildly slow down, accelerate, or swerve). In contrast, if the collision cannot be avoided, then the vehicle on-board computing device 220 causes the vehicle 200 to take an emergency maneuver (e.g., brake and/or change direction of travel).

Figure 3:
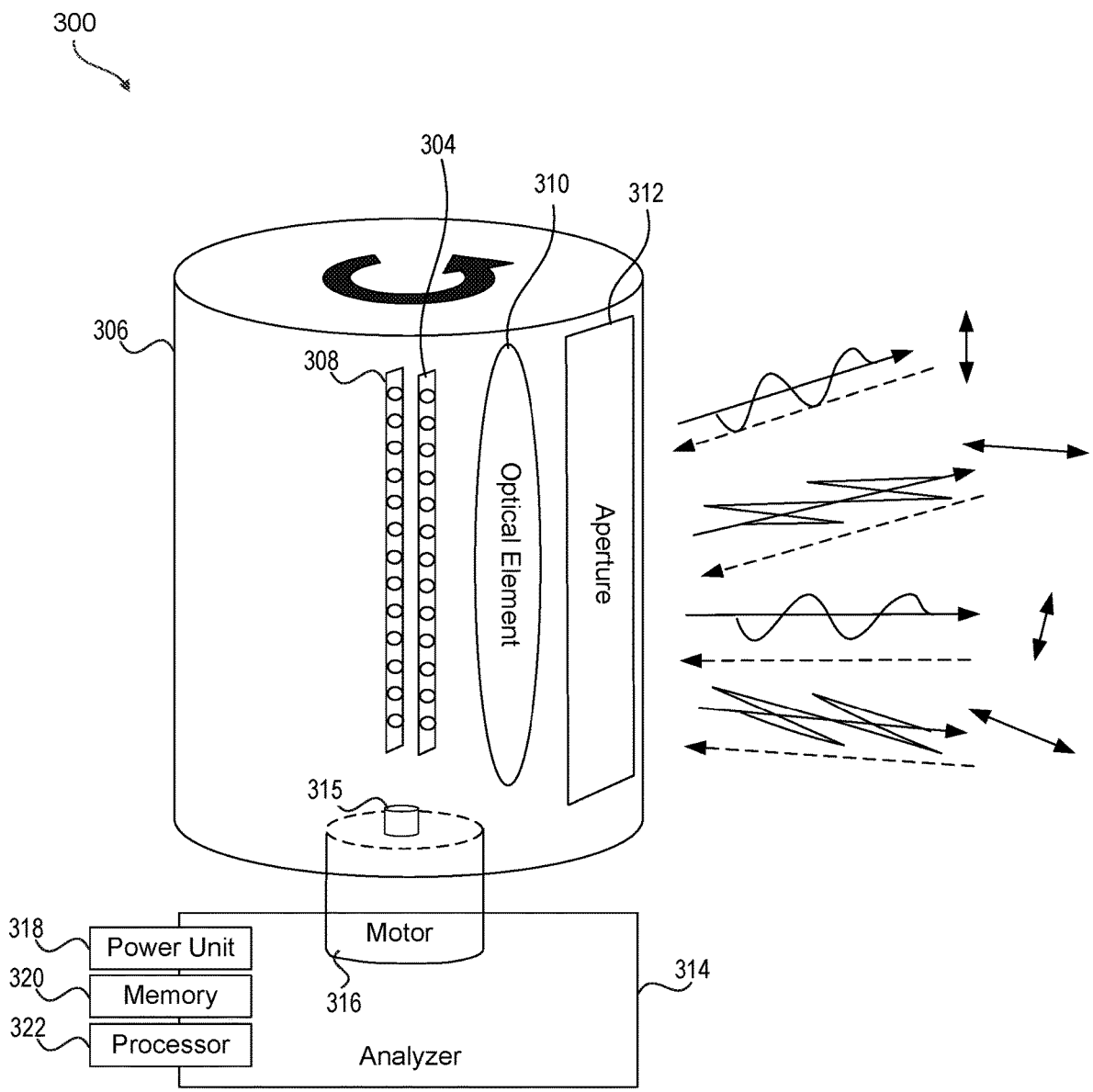
FIG. 3 illustrates an exemplary architecture for a LiDAR system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting system 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
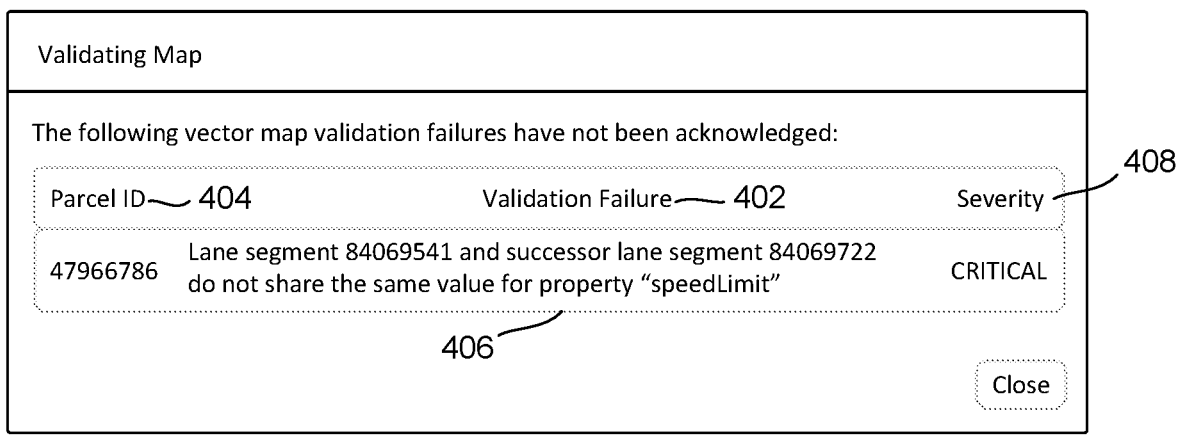
FIG. 4 illustrates an example UI for vector map validation, according to some embodiments.

FIG. 4 is a user interface (UI) 400 for illustrating an example vector map validation failure, according to some embodiments.

Vector maps may include, but not be limited to, various errors, such as incorrectly mapped key points, incorrect depth assignments, incorrect sizing of known geometries such as roads, sidewalks, crosswalks, missing or incorrect yielding relationships defined at intersections, no traffic control measures defined at an intersection, invalid geometry (overlapping, self-intersecting, outside of road surface, etc.), inaccurate speed limits or incorrect placement of objects (e.g., road signs, traffic lights, etc.). In addition, common traffic flow errors may occur, such as overlapping lanes, improper alignment of features, incompatible traffic directions or signage, speed limit incompatibilities, missing or obscured objects.

The technology described herein, in some embodiments, programmatically determines if errors occur within one or more areas (e.g., parcels or geometric sections) within a vector map by validating (e.g., using validation checks) a series of vector map objects (i.e., content) for both preexisting (i.e., persistent) as well as new content. In one non-limiting example, user interface (UI) 400 illustrates at least one vector map validation failure 402 that has not yet been acknowledged. Validation failure 402 may include a parcel identifier (ID) 404, a description of the actual failure 406 and its severity 408. The example validation failure 402, reflects, for Parcel ID 47966786, that "Lane segment 84069541 and successor lane segment 84069722 do not share the same value for property "speed limit". It would be expected, but not required, that successor lane segments would share a same speed limit. When they are found not to share the same speed limit, the validation failure is classified with a "critical" severity. The validation failure would need to be reviewed to determine if it is accurate and, if valid, the validation failure acknowledged (not ignored). Publishing a vector map with this validation error may cause undesired behavior for an autonomous vehicle configured with this map. As will be described throughout, these validation failures need to be reviewed before publishing a map with this parcel.

Figure 5:
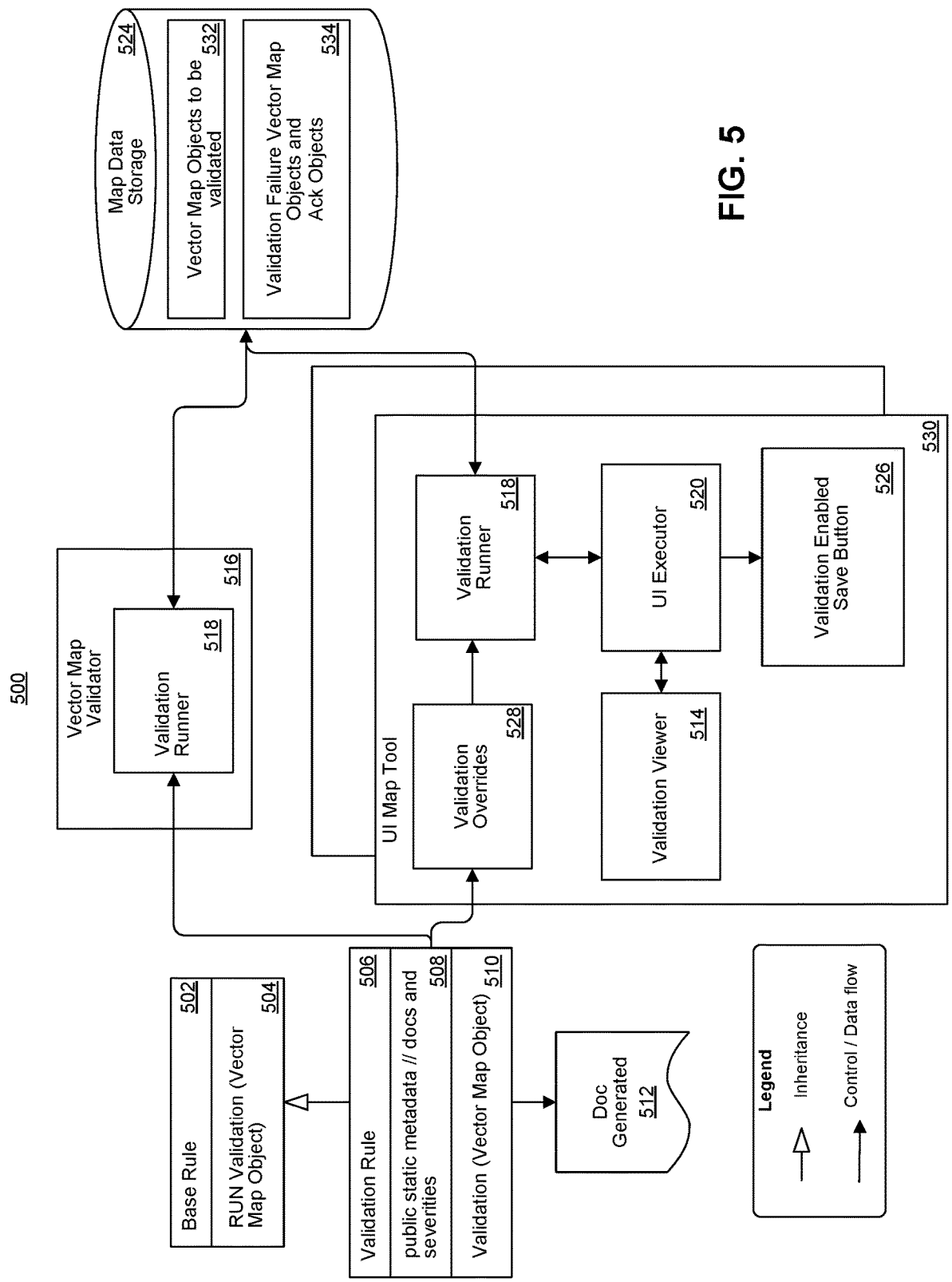
FIG. 5 illustrates a block diagram of a system for vector map validation, according to some embodiments.

FIG. 5 is block diagram of a system for vector map validation, according to some embodiments. Validation system 500 may be performed by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the processes described may be performed simultaneously, or in a different order than shown in FIG. 5, as will be understood by a person of ordinary skill in the art.

Validation checks may be split into separate classes to make up a series of 'rules'. The rules reflect known functional relationships (e.g., principals) of map entities, as well as the underlying assumptions of the traffic laws and norms, such as known relationships of roads to signs (e.g., stop signs are located at an intersection of two roads). A collection of rules may be compared to an entire map or any subset of the map, e.g., the content of a parcel for a vector map. A single rule may have one or more of the following properties: contains one or more checks, adheres to a common interface for invocation, is self-documenting in that it exposes Metadata describing its constituent checks, is concerned with validating content (e.g., VMOs) of a specific type that has met some predefined criteria (i.e., a rule will not validate both a lane and a traffic control measure other than the association between them), is independent of other rules, is repeatable (e.g., multiple runs of the same rule yield the same results) or one or more checks that may exist for a VMO child class may be relocated to its own class (i.e., a child of a base rule class).

A non-limiting example rule may be that an intersection cannot allow traffic flow in all directions simultaneously. So, if a new intersection is being added to a vector map and a subsequent validation check against the rules set, including traffic intersection rules, indicates that this rule would be violated (e.g., no stop signs or traffic signals), it may be flagged as a validation error and need additional review, especially before updates are published for the vector map.

Any rule class that implements one or more vector map validation checks should extend a base rule class 502 with Metadata to be added to the class. This Metadata can allow the system to generate an intermediate representation (IR) 512 (Doc Generation) that can be consumed by a vector map policy documentation site. In some embodiments, the validation system may include an export functionality which allows an external system (e.g., a documentation website) to consume validation rule Metadata in a structured text format.

A script builds the intermediate representation from the classes (using specific directories to search and/or making use of the fact that a base rule is in the prototype chain of each rule), pulls out the Metadata field and transforms it into Java Script Object Notation (JSON) or a similar well known file structure. The vector map policy documentation site then consumes the intermediate representation either as a build artifact or through distributed version control system submodules.

In adding a rule type to types to be used for validation, rules that apply to that type are enabled with their default severity. For example by requiring rule types to validate and encompass all rules for a given type with a set severity by default, consuming applications are not required to update their configuration every time a rule is added/removed to that type. Rule overrides may be defined by rule configurations, containing a rule name and severity level to set on the application level. The usage of rules to override is not strictly necessary, as a default derived from types to validate may be implemented for an initial configuration. This allows applications to define configurations.

Validation failures may have different levels of severity indicating the significance of the validation failure to the health of the map. In one embodiment, rules may be run with their predetermined default severity. Different levels of severity include, but are not limited to:

1. EXPERIMENTAL—A check that is being evaluated/is in active development has failed.
2. FLAGGED—A check that is of importance to the development team has failed.
3. INFO—Minor issues that should be noted, but do not require a map reviewer (e.g., operator) sign off.
4. WARNING—A check that requires rectification/map reviewer sign off has occurred. Usually refers to failures that could cause issues but may also be intended/false-positive.
5. CRITICAL—A check that requires rectification/map reviewer sign off has occurred. Usually refers to failures that are unlikely to be intended.
6. REQUIRED—A check that cannot be signed off by a map reviewer has been detected. User must rectify (e.g., by editing proposed new content).

A list of applications are generated with a series of rules to be enforced for each application (and its modes). For example, sign-based rules are most likely to be associated with an application utilized to add/modify signs in the vector map.

Individual Validation Rules 506 are configured as classes extending a Base Rule class 502. These classes provide a standard set of Metadata and Severity 508 and implement a RUN Validation method 504 to check a Vector Map Object (VMO) 510 for validation failures. An intermediate object is returned (doc generated 512), which is subsequently converted into a Validation Failure Vector Map Object 534. A public static Metadata property 508 in every Validation Rule 506 is used to configure default severities for validation errors and to store the doc generated 512 for the errors (cause and recommended solution). This state is read and used to populate the documentation website with a list of all possible validation failures.

Validation Rules 506 are executed by the Validation Runner 518 and may be configured in one of two ways. First, they may be direct, by passing a set of Vector Map Objects to validate one-by-one by Vector Map Validator 516. Vector Map Validator 516 runs all rules against a defined area which includes vector map objects and acts as the final authority on the validation status of the map. This tool runs as a command-line utility and has no user interface apart from emission of logs and additions/modifications to the validation failures in Map Data Storage. This is the approach used, for example, by headless applications.

Second, validation rules 506 may be executed by a Validation Runner 518 within User Interface (UI Map Tool 530). Multiple UI Map Tools 530 (mapping web application) are user interfaces used by operators (users) to modify the state of the map by reading and writing Vector Map Objects 532 in the Map Data Storage 524. Each of these tools uses the Validation Runner as a software library to execute validations upon the vector map objects it edits. Some non-limiting examples of UI Map Tools include a sign editor for positioning road signs and a traffic signal wizard for configuring the position and shape of traffic signals. A UI Executer 520 component orchestrates the Validation Runner 518 within a mapping web application and interprets its actions to display to the user via the Validation Viewer 514 and Validation Enabled Save Button 526.

Validation Viewer 514 may be a UI used to acknowledge outstanding Validation Failure Acknowledgments (VFAs).

As previously described, UI 400 (FIG. 4) illustrates an example instance of an outstanding Validation Failure that has yet to be acknowledged.

For example, based on the validation context, the UI may provide a toolbar widget for indicating validation failures that have occurred and a modal dialog to understand them, find relevant VMOs that are related to them, and acknowledge or accept/reject them.

Validation Enabled Save Button 526, based on the validation context, displays a save widget on the toolbar and handles disabling the widget when save is disallowed (e.g., such as when there are unacknowledged Validation Failures or if any Validation Failures have REQUIRED severity). Editors may save a map that includes Validation Failures with CRITICAL or WARNING severity levels by acknowledging the failure. REQUIRED severity indicates that the failure in question can never be accepted and, as a result, the user must edit the map to remove the failure before saving the map can be allowed. This behavior is enforced by Validation Enabled Save Button.

A set of Validation Overrides 528 may be specified within each mapping web application. These overrides select which validation rules are run within the web application and the severity at which they are run. Severities may be changed in a mapping web application where a user should be notified of a violation, but the violation may be corrected in a later edit to the map via another mapping web application.

Validation Runner 518 may be configured to change the rules that it executes and the behavior of those rules. Configuration is performed via an argument to the validate method. Applications accessing the validation runner 518 indirectly through UI Map Tool 530 may modify a mode via the validation mode property. The mode allows clients to configure two aspects of validation: which VMOs are validated and, for the validation rules that apply to those VMOs, the severity of the validation failures generated by those rules.

In a non-limiting embodiment, there can be multiple vector map Validation Failure Acknowledgments (VFAs) for one vector map validation failure. For example, a single failure may need acknowledgment by multiple operators who work on it as well as an operator who accepts it in the quality assurance (QA) stage, as described in greater detail in association with FIG. 6B.

A set of Vector Map Objects 532 are stored in the Map Data Storage 524. These are read and written by UI Map Tools and read by the Validation Runner to provide the data upon which validation rules are run. Stored in the Map Data Storage 524 are a set of Validation Failure Vector Map Objects and Validation Failure Acknowledgment Vector Map Objects 534. These are read and written by the Validation Runner 518. In particular, Validation Runner 518 may create new Validation Failures or modify existing Validation Failures and may (when instructed by the UI Executor 520) create or modify Validation Failure Acknowledgments.

Validation failures and validation failure acknowledgments, in some embodiments, may be stored to the map data storage 524 via models. These models may include, but not be limited to:
Validation Map Validation Failure Models:
  1. Vector Map Validation Failure—the severity of the validation failure, name of the specific validation failure which occurred. In the client code and UI common libraries, this is a checksum Base. There can be different failures with different validation names generated by one validation rule. Checksums are computed to uniquely identify validation failures. The checksum may be computed in a browser, be deterministic, or minimize chances of collision. Given the variety of fields that are common amongst all map data storage entities representing vector map objects, there is a limited selection of fields that both exist on all entities and are unlikely to change. There is also the fact that the number of map data storage entities that are a constituent of a validation failure is variable. To compute the checksum, the Globally Unique Identifier (GUID) or Universal Unique Identifier (UUID) type of each participating entity and the name of the validation failure is used to compute the checksum. To ensure checksums are computed in a repeatable manner, checksums are sorted lexicographically and processed in order.

2. Checksum—the causality of a validation failure is uniquely identified by a checksum, which is computed using as input the checksum base, the Vector Map Objects that were involved in the failure, and failure-specific additional Metadata that may be needed to distinguish one failure from another. When UI executor 520 receives an error from the Validation Runner 518, it converts the error's state into a checksum; two errors with the same checksum are treated as the same Validation Failure.

3. State—either VALID or INVALID. When the map is changed so that a failure is corrected, UI executor 520 detects a lack of a previously-seen Validation Failure and switches that failure to INVALID so subsequent steps of map flow know that failure is no longer meaningful.

Vector Map Validation Failure Acknowledgment:
1. Email of the user who acknowledged or accepted the validation failure.
2. Is this by the Original Mapper (e.g., operator)?—if true, this acknowledgment is from the user whose map changes first introduced the validation failure.
3. State—UNACKNOWLEDGED, ACCEPTED, REJECTED, or INVALID. INVALID is used to identify acknowledgments associated with failures that are now INVALID. UNACKNOWLEDGED and ACCEPTED are used by map editors, while a QA operator considers each validation failure and sets it to ACCEPTED or REJECTED. An editor cannot save edits unless all acknowledgeable validation failures have been ACCEPTED, and a QA engineer cannot sign off on a map unless all validation failures are ACCEPTED. In some embodiments, map editors and QA engineers may receive different Vector Map Validation Failure Acknowledgment objects when they interact with the UI (i.e., an individual validation failure may have at least one acknowledgment from the original map editor and at least one acknowledgment from a QA engineer associated with it).

Figure 6A:
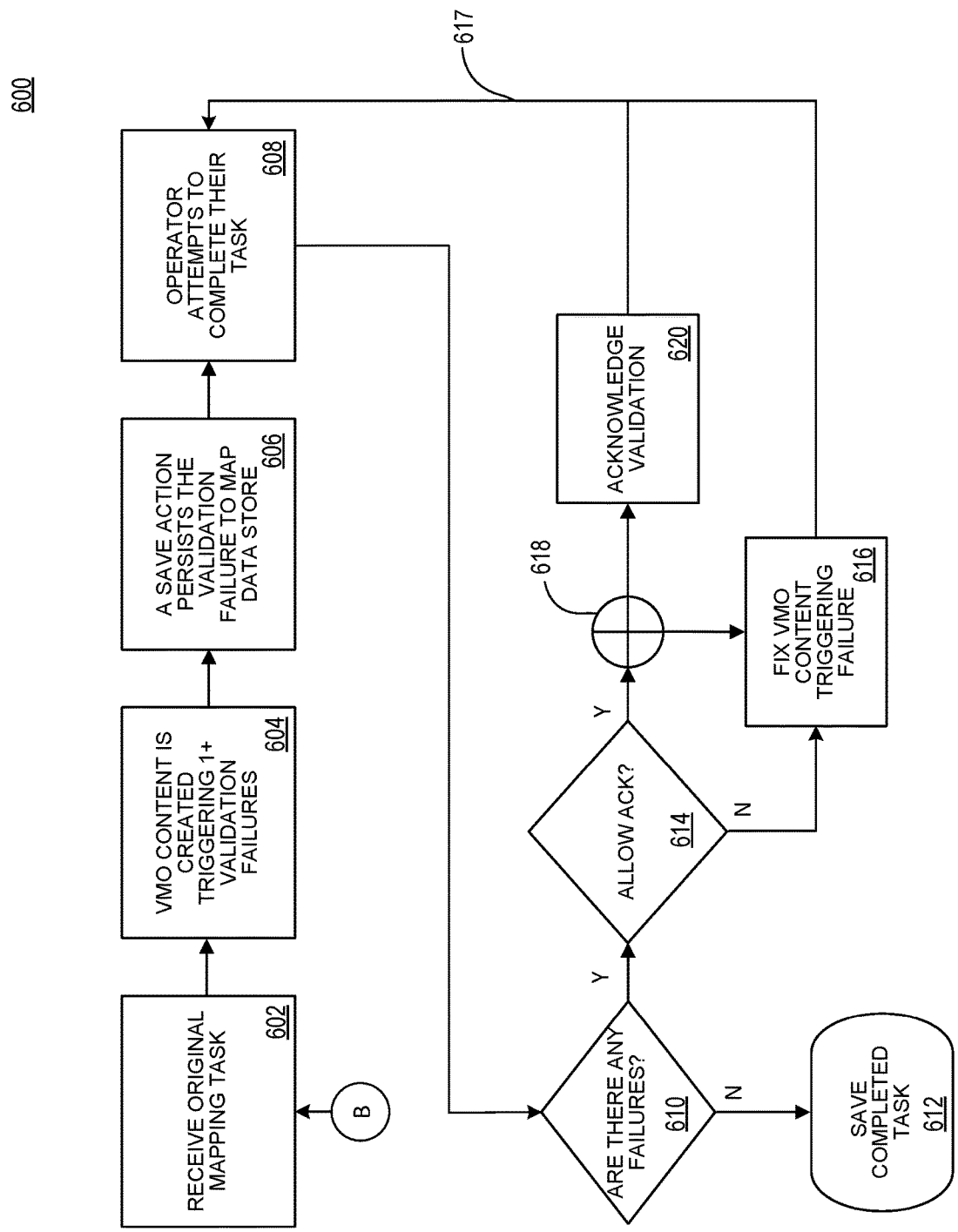
FIG. 6A and FIG. 6B, collectively, illustrate a flow diagram of vector map validation, according to some embodiments.
Figure 6B:
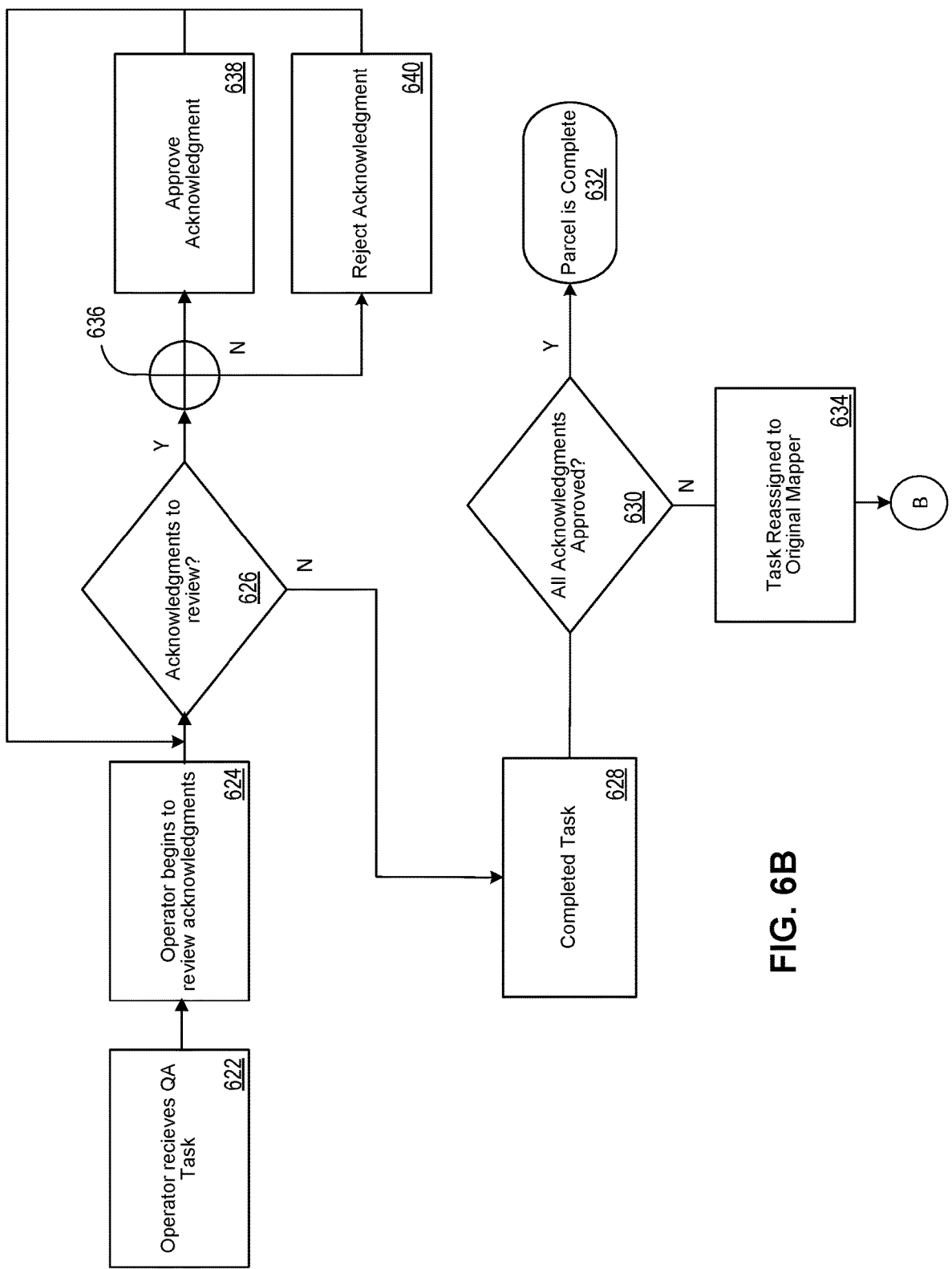

FIGS. 6A and 6B, collectively, illustrate an exemplary block diagram 600 of validating a vector map, according to some embodiments. Block diagram 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 6A and 6B, as will be understood by a person of ordinary skill in the art.

A vector map may include a plurality of points representing various objects within a field of view. Many of these points may be key points needed to identify objects through their boundaries (e.g., vertices, edges, surfaces, etc.). A vector map creation workflow order may include, for each application that is a part of the workflow, a task for creating content in a single parcel. After initial creation, the work is quality checked for quality assurance on the created content. For these two stages of the pipeline, performing acknowledgments on the content created must be taken into account. FIG. 6A-6B demonstrates a workflow for operator originated tasks.

For original content creation mapping tasks, an original mapping task 602 is received by a user to be performed in a mapping web application. The mapping web application and the web application's mode determine which validation rules are run. When the data for the task is loaded, existing vector features and proposed vector features for a parcel of interest are loaded (e.g., loading the set of validation rules that are relevant to the task).

As the operator makes edits to complete their task of creating new content (VMOs) to an existing vector map, one or more validation failures may be created 604. Validation failures are created as a result of a violation of a vector map production policy between one or more vector map entities. For each application, a list of validations that apply to the application are generated. Starting with a first application in the vector map content creation process, the validation rules which validate the content, which is being added/modified in the vector map, are the ones which are enabled (e.g., validation rules targeting signs are run in an application used to add/modify signs in the vector map). Coordination with the system reduces the list of pre-existing validations. To eliminate pre-existing validations, operator tasks are created for operators to process.

In 606, a save action persists the validation failure to the map data storage. For non-REQUIRED validation failures (VFs), a corresponding validation failure acknowledgment is also created in UNACKNOWLEDGED state. These are merged into the existing set of VFs loaded from the map data store.

In 608, the operator attempts to complete their task. Validation failures can have one of two states, valid or invalid. During the course of running validations, any new and pre-existing validation failures are required to receive acknowledgment. Any of the validation failures that meet these criteria have a 'valid' state, regardless of the number of acknowledgments they have at a given time. One circumstance where a validation failure has an 'invalid' state is when it has been previously been persisted to the map data storage and vector map content, that constitutes the failure, no longer exists (e.g., partially or completely), either by deletion or vector map content manipulation (e.g., Drivable Areas are no longer overlapping).

In a non-limiting example, assume two Drivable Areas (DAs) slightly overlap. Both have been persisted to the map data storage, as has their corresponding validation failure with a valid state. Deleting one of the DAs and saving moves the Validation Failure to the "invalid" state. Creation of a new DA constitutes a new Validation Failure with the valid state, and does not modify the original one. Manipulating the DAs such that they no longer overlap moves the Validation Failure to the invalid state. Modifying them such that they overlap again moves the original validation failure to the valid state. However, acknowledgments still hold.

Detection for an invalid state occurs during validation detection on the front end. When a validation failure that has been previously created cannot be detected, it is assigned an invalid state. Validation failures can move from the invalid state to the valid state by vector content modification that causes the same validation failure. As will be described in greater detail hereafter, an operator cannot complete their task until all VALID VFs have an associated VFA in an ACCEPTED state. REQUIRED VFs do not have associated VFAs and therefore the system blocks completion until they are invalidated by changing the map.

In 610, it is determined if any validation failures exist. If there are no validation failures, in 612, the task is saved as completed. However, if validation failures exist, they may be acknowledged 614 (e.g., trigger the validation failure 616) or may be repaired/fixed (i.e., fix the content) until no validation failure exists. Element 618 represents a decision point for the user, where a user may move forward by changing the map so that the validation failure no longer occurs or by acknowledging the validation failure.

Figure 7:
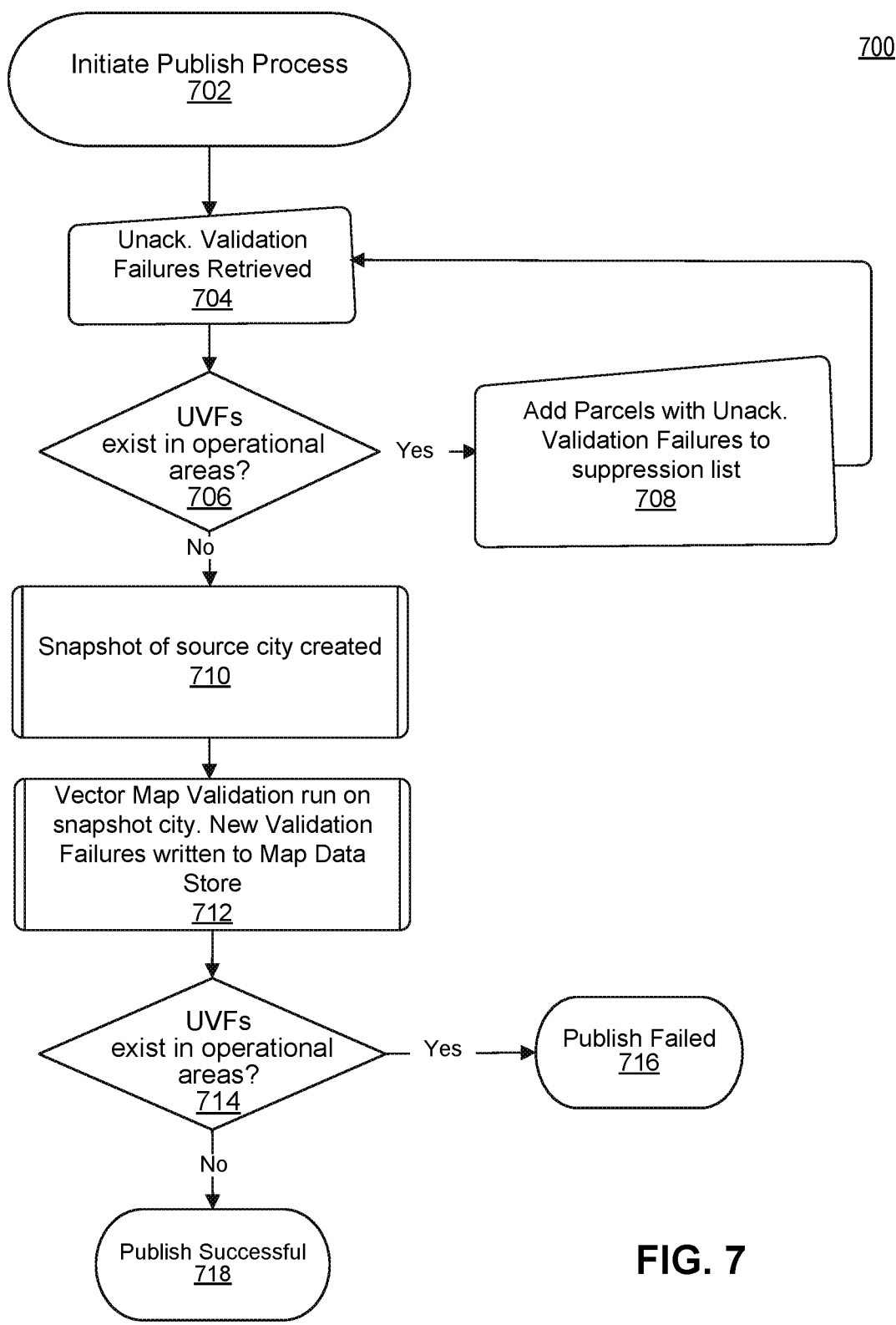
FIG. 7 illustrates a flow diagram of publishing a vector map, according to some embodiments.

An acknowledgement of the validation failure 620 allows low severity, non-required (e.g., critical) errors to remain in the vector map process up until a publish event takes place (See FIG. 7). For tasks, with a validation failure severity of WARNING, CRITICAL or REQUIRED, in some embodiments, the progress may not be saved. In order to save and complete their task, the task must rectify the validation failure by editing the vector map content, or perform an acknowledgement on the violation. For validation failures with a severity of REQUIRED, the operator fixes the violation by editing vector map content, and the UI does not allow acknowledgment of these failures.

In 617, post acknowledgement/fixed tasks are fed back to check again for validation failures. For example, a validation failure may be fixed for incompatibility with one traffic-related issue, but after repair, may be incompatible with other rules and therefore incur additional validation failures.

FIG. 6B illustrates a quality assurance workflow. During the quality assurance of a parcel, an operator has the opportunity to approve/reject the work completed in the parcel, or to pause the review of the content. The approval or rejection of the content for a parcel with one or more validation failures that have been signed off on by the original mapper must also receive the acknowledgement of the individual performing the review for WARNING or CRITICAL violations. Operators performing QA see a notification marker to approve/reject acknowledgments.

When an initial build task is completed, a subsequent QA task to review acknowledgments 624 of validation failures may be received 622. In this QA task, the VALID VFs loaded from the map generate new VFAs attached for a new operator performing this QA task, all in UNACKNOWLEDGED state.

For the Operator to complete the QA task, the task may be marked as ACCEPTED or REJECTED, where ACCEPTED=passed quality control and REJECTED=failed quality control and sent back to the builder for additional changes to be made. The task can be completed when all VFs have an associated VFA in either ACCEPTED or REJECTED state. In 626, the system determines if acknowledgments exist to review and allows a user to reject an Acknowledgement that was made by the builder on an individual basis.

In 636, the "circle-plus" represents a user decision point where a user may move forward by either approving or rejecting the acknowledgment. If one or more acknowledgements exist to review, the acknowledgments are either approved 638 or rejected 640. A task with all VFAs in ACCEPTED state may be approved 638; otherwise, the task can be rejected 640 and is reassigned to the original mapper for edits. If no acknowledgments exist to review, the QA task is completed 628. In 630, a check is made to confirm that all acknowledgments have been approved. For example, 630 prevents approval of a task (i.e., task must be Rejected) if any acknowledgments are rejected. In 632, if all acknowledgments have been approved, the parcel is complete and may be published. However, if all acknowledgments are not approved, a task is reassigned to the original mapping task 602.

In some embodiments, edits to the map content may not generate a QA task to verify changes to the map (e.g., operator generated tasks). For example, there are scenarios where operators modify vector map content outside the scope of Operator Management delegated tasks. In going "out of band", operators receive exclusive edit rights to a parcel. When they have completed making any desired modifications, operators either may save their current work, or save their work and simultaneously release their lock on the parcel thus ending their editing session. As these edits are not backed by Operator Management and do not contain an explicit QA step, both saving options for "out of band" work have the same requirements as the save and complete option for operator generated work—they must either rectify the validation failure by editing the vector map content, or perform an acknowledgement of the validation failure.

For these cases not requiring a QA cycle, operators continue to be permitted to save their current work to a temporary staging area (not persisted to the map store) as well as to save and pause their current task, regardless of the number of current validation failures that are currently present. This behavior minimizes deviation from the current behavior of the applications, allows users to hold off on completing a task while awaiting policy clarification, allows users to step away from their workstation as needed and may eliminate potential for an application's tools to enter unfavorable operation states (e.g., data loss) due to a violation that is in place.

The implication of maintaining this behavior is that unacknowledged validation failure entities are persisted to the map data storage alongside the content that is creating the validation failure. Because the workflow requires that the work unit be worked on again, until fixed or acknowledged, operators may pick up the work as it was left off. As such, endpoints for persisting validation failures and retrieving them later are created.

When creating vector map content, validation failures may be either persisted to the map data storage (e.g., as a result of the save and pause or save actions) or solely in the user's browser (e.g., prior to any save action occurring). For cases in which the validation failure only exists in the browser-space, users are able to revoke their acknowledgment of a validation failure via a UI. For acknowledgments that have been persisted to the map data storage, operators performing original mapping tasks are able to 'revoke' acknowledgments as well. In both cases, unpersisted and persisted validations have their state field updated to UNACKNOWLEDGED.

In some embodiments, a determination is made of whether or not a task can be automatically completed or not upon render (i.e., drawing). The component must be modified to take the validation context into effect, and whether blocking failures exist on the context. In the event blocking failures do exist, the task may never be autocompleted. For example, a critical validation failure may be blocked from automatic completion.

In some embodiments, users may have the ability to undo and redo the actions/tasks that they have performed. As vector map content is created that violates the current policy, validation failures are added to the local state store. Should a user choose to undo their current work, the removal of validations failures act similar to how they do for other vector map content today; prior to any save action, a user's action can be undone/redone, once a save action occurs, undo/redo is no longer possible for unpersisted content.

FIG. 7 is a flowchart for vector map publishing, according to some embodiments. The vector map publishing pipeline 700 may be performed by a processing system that includes processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

In some embodiments, in order for a portion (i.e., parcel) of a vector map to be operated on autonomously (i.e., unsuppressed), validation failures of a severity of at least REQUIRED should be eliminated. In some embodiments, validation failures of a severity of WARNING or CRITICAL should have an accompanying validation failure acknowledgment in a state of ACCEPTED. This validation enforcement is performed at map publish time as part of a vector map publish pipeline 700. For example, if no validation failures exist, the vector map may be published without suppressing any impacted areas (e.g., parcel). However, if critical validation failures exist, they must be repaired before publishing. Acknowledged validation failures of a lower severity level may be published while suppressing a specific impacted area (e.g., parcel) where the validation failure occurs.

When publishing a map via a publishing web application or an automated process, a few options may be configurable by the user to control the validation system. In a non-limiting example, validations may be run at publish. For example, the system may run a validation on a publish city artifact during the publish process. In another non-limiting example, publishing with a validation failure may abort the publish process if any unacknowledged validation failures are found in the publish city artifact. In another example, specifying a version identifier for the validation configuration (i.e., tag an image for a private repository) may be included to utilize for the validation.

In 702, when the publish process is initiated, the set of unacknowledged validation failures are retrieved from the map data storage.

In 704, a search is triggered to determine if any Unacknowledged Validation Failures (UVFs) exist in unsuppressed areas of the source city and report the results.

In 706, if any unacknowledged validation failures are found (Yes), users must, either fix/acknowledge the validation failures or, in 708, add the parcel which includes the validation failure to a suppression list (exclude from the published vector map).

If no unacknowledged validation failures exist, the "Publish Map" phase may begin. In 710, a snapshot of a source city is created and another validation process 712 is run on the snapshot. The snapshot, in some embodiments, may be a copy of all vector map objects composing a city, with all internal references within the copied vector map objects adjusted to refer to the copies. This creates a new instance of the source city at a specific point in time.

In 714, an additional unacknowledged validation failure search is performed on the snapshot city to determine if unacknowledged validation failures exist in operational areas. In 716, if any unacknowledged validation failures are located in unsuppressed areas, the publish process fails. However, if no unacknowledged validation failures exist, in 718, the map publishes successfully.

Figure 8:
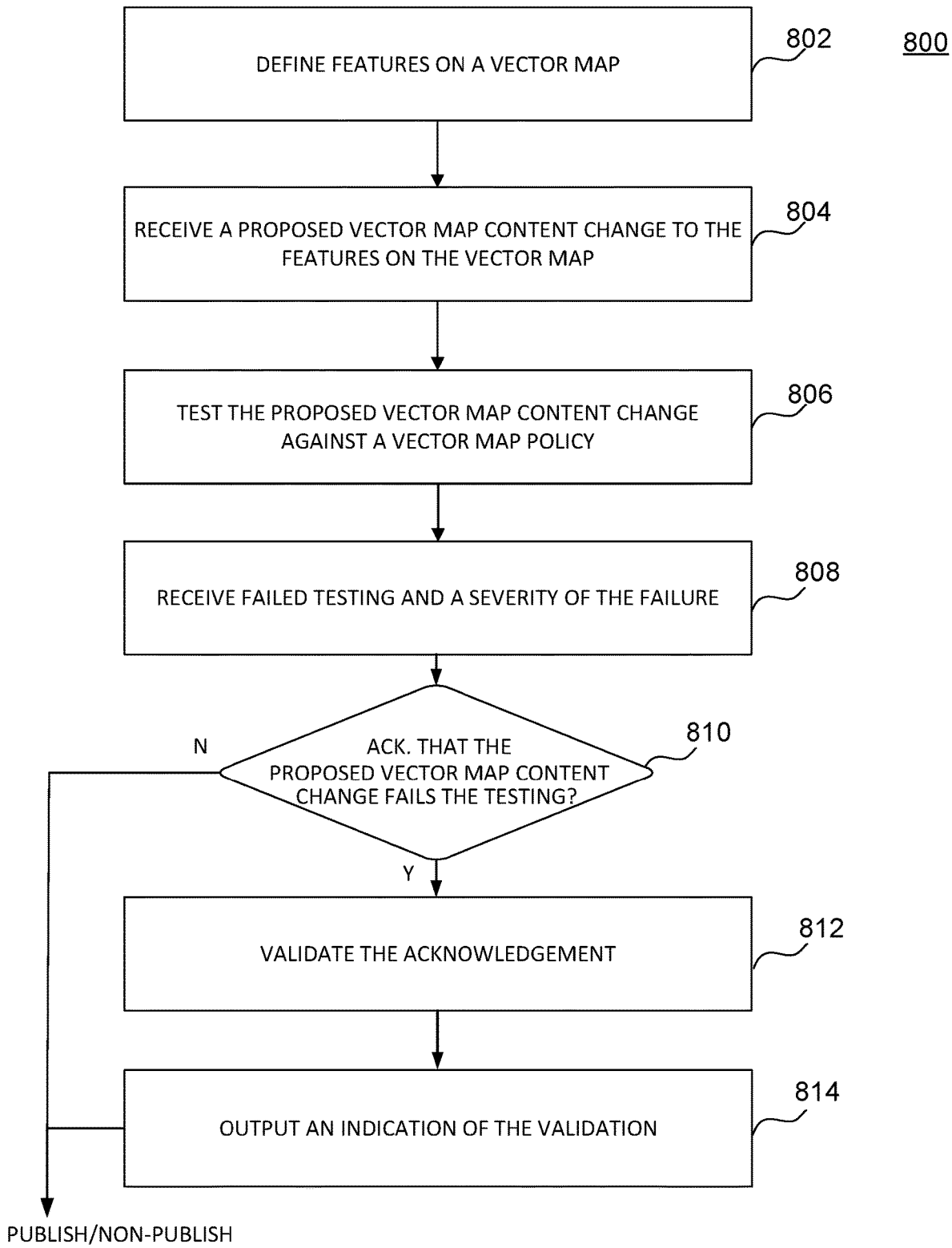
FIG. 8 illustrates a flow diagram of vector map validation, according to some embodiments.

FIG. 8 is a flowchart for vector map validation, according to an embodiment. The Vector map validation process 800 may be performed by a processing system that includes processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

At step 802, the processing system defines new features to be added to a vector map. For example, new content being added to a selected parcel of the vector map. While described herein for new features, existing features may be subjected to the validation process. For example, a previously validated feature may incur a validation failure based on its relationship to newly-added features. In a non-limiting example, a road that previously was approved within the vector map may be expanded (e.g., lanes added) and therefore no longer comply with previous traffic flow conditions.

At step 804, the processing system identifies a proposed vector map content change to the features on the vector map to be tested for compliance against a collection of rules (vector map policies). In one aspect, the rules may be filtered for a subset of rules applying to a specific element relevant to the contents of a parcel for a vector map. For example, the subset may be a group of rules directed to signage.

At step 806, the processing system tests the proposed vector map content change against the vector map policy. The testing may include a series of tests of one or more rules against one or more features.

At step 808, the processing system recognizes failed testing (i.e., validation failures) and the severity of the validation failures. For example, a road sign is missing from an intersection of the new content and is labeled as a critical validation failure as an autonomous vehicle may require proper traffic signals when approaching this intersection.

At step 810, the processing determines if an acknowledgement that the proposed vector map content change fails the testing (i.e., acknowledgment of validation failure) was received. If the acknowledgement has not been made, at step 816, the processing system makes a determination to publish with a suppression of the parcel where the validation failure is not acknowledged or not to publish (e.g., abort). If an acknowledgement that the proposed vector map content change fails the testing (e.g., acknowledgment of validation failure) was received, at step 812, the processing system validates the acknowledgment and provides an indication of this acknowledgement to determine, in step 816, to publish or not publish. For example, for low severity level validation failures, the processing system may publish. For high level (e.g., critical or required) severity levels, the map is not published.

Figure 9:
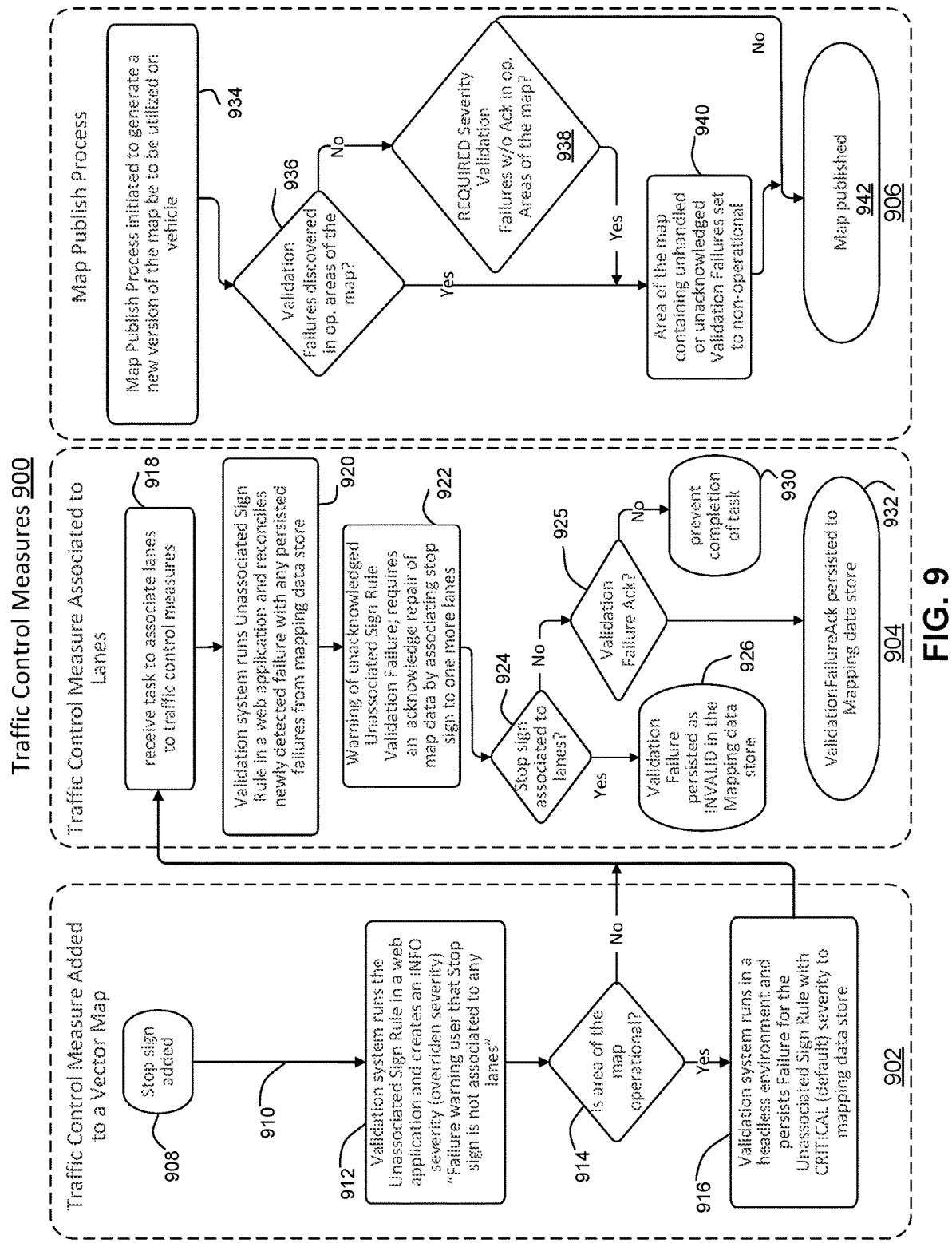
FIG. 9 illustrates a flow diagram of a traffic control measure, according to some embodiments.

FIG. 9 illustrates a vector map validation flow diagram of a traffic control measure, according to some embodiments. The vector map validation process 900 may be performed by a processing system that includes processing logic that can comprise hardware (e.g., circuitry, dedicated logic, programmable logic, microcode, etc.), software (e.g., instructions executing on a processing device), or a combination thereof.

The process of adding a stop sign to a vector map will be described in three workflows—traffic control measure added to a vector map 902, a traffic control measure associated with lane 904, and a map publish process 906. While described in three distinct process flows, it is appreciated that not all steps may be needed to perform the disclosure provided herein. Further, some of the steps may be performed simultaneously, or in a different order than shown in FIG. 9, as will be understood by a person of ordinary skill in the art.

In step 908, the validation system adds a new stop sign (content) as a feature to a parcel in a vector map and feeds (910) this feature (i.e., vector object) to validation system.

In step 912, the validation system runs the Unassociated Sign Rule in a web application and creates an INFO severity. In this example, the severity warning is "Failure warning user that a stop sign is not associated with any lanes".

In step 914, a calculation is made to determine if the Vector Map has been fully built and quality controlled as well as vehicle operations are permitted in this area.

In step 916, the validation system runs in a headless environment and persists failure for the Unassociated Sign Rule with a CRITICAL (e.g., default) severity to a map data storage (e.g., server). The data store may be located locally or remotely (e.g., cloud storage).

In section 904, the validation system associates traffic control measures with the travel lanes. In step 918, the validation system receives a task to associate lanes to traffic control measures.

In step, 920, the validation system runs the Unassociated Sign Rule in a web application and reconciles newly detected failures with any persisted failures from the map data storage.

In step, 922, the validation system generates a warning of an unacknowledged unassociated sign rule validation failure and requires an acknowledgment or repair of map data by associating stop sign to one or more lanes.

In step, 924, the validation system determines if the stop sign is associated with lanes. If the stop sign is not associated with lanes, in step 925, the validation system requests a user validation failure acknowledgment. If the user does not provide this acknowledgment, the validation system, in step 930, prevents completion of the task. However, if the acknowledgement is received, the validation system, in step 932, persists the validation failure acknowledgment to the map data storage. If the stop sign is associated with lanes, the validation system, in step 926, saves the validation failure persisted as INVALID in the map data storage.

In section 906, the map publish process is described. In step 934, the map publish process is initiated to generate a new version of the vector map to be utilized on an autonomous vehicle (e.g., vehicle 102a). The map publish process may be triggered manually or automatically. The validation system, in step 936, determines if REQUIRED severity validation failures were discovered within operating areas of the vector map to publish. The validation system, in step 938, determines if a CRITICAL/WARNING severity validation failure was discovered within operating areas of the vector map to publish.

The validation system, in step 940, flags or sets to "non-operational" any areas of the map containing unhandled or unacknowledged validation failures (suppresses them during publishing) and the validation system publishes the vector map in step 942.

The technology described herein has many benefits. One benefit is an ability to validate proposed and persisted mapping data (i.e., merge data between multiple data sources). Another benefit is a resilience to generate validation failures for different types of mapping entities, which may not have any commonalities with respect to predefined fields on the entities. Another benefit is a reconciliation system which includes parallelization and may prevent duplication/concurrency issues. This includes duplications that are temporal in nature (e.g., "A Validation Failure 'A' was found a week ago, and has been re-encountered after mutations to the map after some arbitrary amount of time has passed") and data driven (e.g., "Do not create a duplicate Validation Failure if a reciprocal error was found" e.g. Sign A is a duplicate of Sign B, Sign B is a duplicate of Sign A—only one Validation Failure is created). Another benefit is an expressive configuration system that may include multiple layers of customization (e.g., base configuration, application-specific configuration, and environment overrides). Another benefit is a multi-step acknowledgement system for auditing purposes. Another benefit is validation may be run in real-time (i.e., as edits are occurring but not yet persisted) or as a stand-alone headless process. Another benefit is self-documenting structure for validation rules. Another benefit is that the validation system supports one or more Validation Checks per Validation Rule. Another benefit is validation failures and associated validation failure acknowledgments are integrated into other processes to prevent mapping issues from reaching persisted data store and/or published artifact. Another benefit is that the technology operates on a highly-connected tree-like data structure. Another benefit is a validation rule generation system to streamline development of new validation rules. Another benefit is configurable runtime options (i.e., run validation rules by type, name, severity, etc.). Another benefit is modularization of validation rules. Another benefit is fault tolerant execution (i.e., fatal error in one validation rule does not prevent the rest of the process and set of validation rules from executing). Another benefit is introduction of new validation rules that can be subsequently run against older maps. Another benefit is adding new rules in response to undesired vehicle behavior to detect existing occurrences of the violation in maps and preventing the same issue from occurring in the future.

Figure 10:
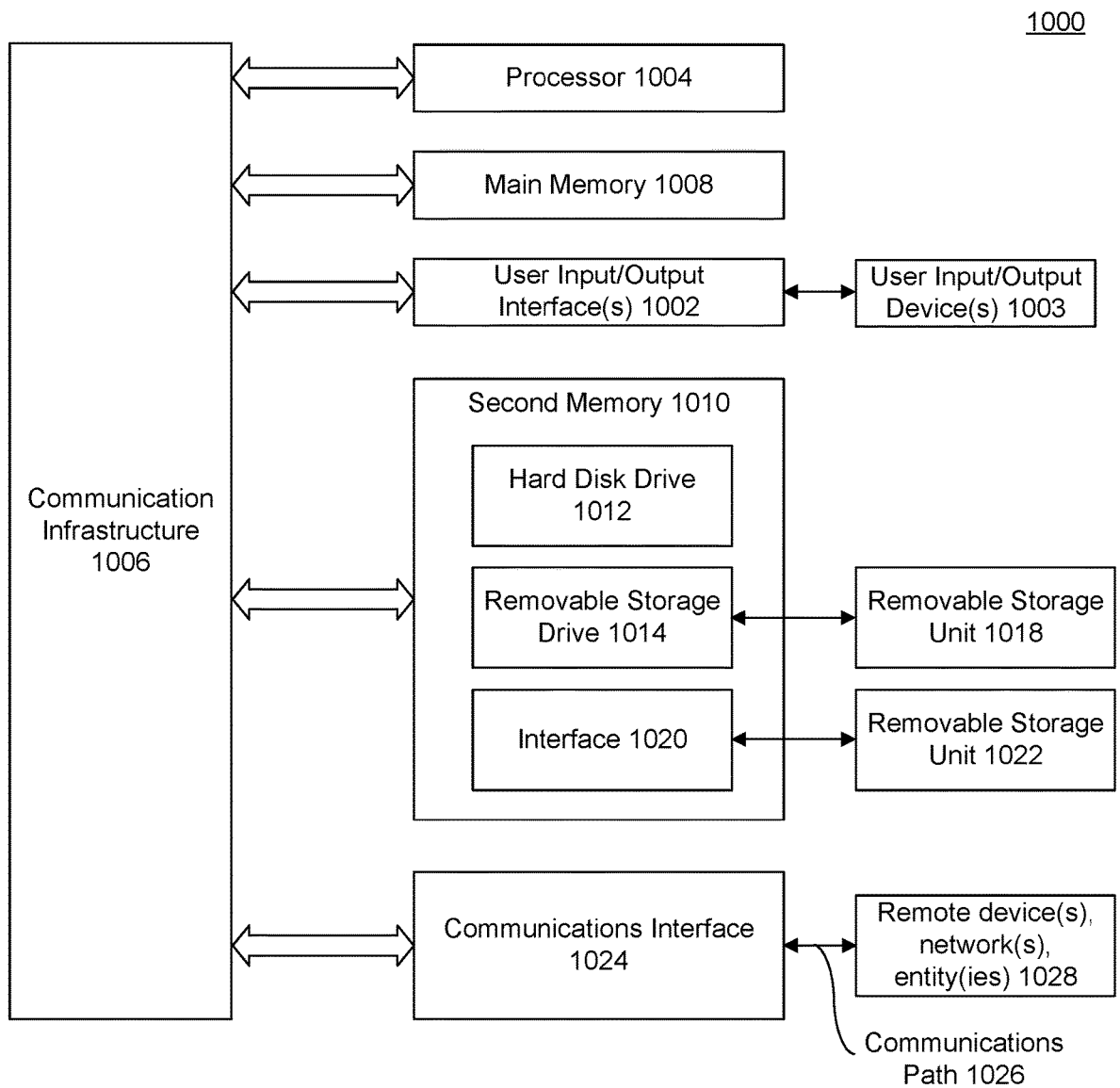
FIG. 10 is an example computer system useful for implementing various embodiments.

Various embodiments can be implemented, for example, using one or more computer systems, such as computer system 1000 shown in FIG. 10. Computer system 1000 can be used, for example, to implement method 800 of FIG. 8. Computer system 1000 can be any computer capable of performing the functions described herein. In a non-limiting example, the computer may be an embedded processing system, a Field-Programmable Gate Array (FPGA) or an Application-Specific Integrated Circuit (ASICs).

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a Graphics Processing Unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as Random Access Memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (e.g., control logic) and/or data. Removable storage unit 1018 may be a floppy disk, magnetic tape, compact disk, DVD, optical storage disk, and/or any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 10210). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method of generating a vector map, the method comprising:
   receiving, by a map data store, a proposed vector map content change to features defined on the vector map, wherein the features are associated with traffic control measures to direct operations of an autonomous vehicle;
   testing the proposed vector map content change against a vector map policy, wherein the vector map policy represents rules defining functional principles of the traffic control measures for at least the proposed vector map content change;
receiving a first indication that the proposed vector map content change failed the testing;
in response to receiving a user acknowledgement of the failed testing, validating the user acknowledgment;
outputting, to the map data store, an indicator of the validation to assist in publishing a new version of the vector map based on the failure, wherein the indicator of the validation includes a severity level of a validation failure selected from a set of multiple validation failure severity levels, and wherein the severity level indicates a significance of the validation failure to a health of the vector map;
publishing, based on the indicator, the new version of the vector map, wherein the new version includes a first map parcel with validation failures below a severity threshold and a second map parcel with the validation failures above the severity threshold; and
communicating the new version of the vector map to the autonomous vehicle, wherein the second map parcel is flagged as non-operational for the autonomous vehicle.

2. The method of claim 1, wherein the indicator further comprises a valid or invalid status of the user acknowledgement.

3. The method of claim 2, further comprising, for the valid status, checking the severity threshold of the failed testing to at least partially assist in a publishing decision.

4. The method of claim 2, further comprising, for the invalid status, initiating a repair of the proposed vector map content change.

5. The method of claim 1, wherein the severity threshold comprises any of: experimental, critical, flagged, required, information only, or warning.

6. The method of claim 1, wherein the second map parcel is flagged by suppressing publishing of a map area where the proposed vector map content change is located.

7. The method of claim 6, wherein the publishing further comprises adding the second map parcel to a list of suppressed areas for the new version of the vector map.

8. The method of claim 1, wherein the vector map features comprise any of:
streets, buildings, traffic signs or traffic signals.

9. A vector map processing system, comprising:
a memory; and
at least one processor coupled to the memory and configured to:
define features on a vector map, wherein the features are associated with traffic control measures to direct operations of an autonomous vehicle;
receive a proposed vector map content change to the features on the vector map;
test the proposed vector map content change against a vector map policy, wherein the vector map policy represents rules defining functional principles of the traffic control measures for the vector map content;
receive a testing indication that the proposed vector map content change failed the testing and a severity of the failed testing;
receive a user acknowledgement of the testing indication that the proposed vector map content change failed the testing and the severity of the failure;
in response to receiving the user acknowledgment, validate the user acknowledgment;
output a validation indication to assist in publishing a new version of the vector map based on the failure, wherein the indicator of the validation includes a severity level of a validation failure selected from a set of multiple validation failure severity levels, and wherein the severity level indicates a significance of the validation failure to a health of the vector map;
publish, based on the indicator, the new version of the vector map, wherein the new version includes a first map parcel with validation failures below a severity threshold and a second map parcel with validation failures above the severity threshold; and
communicate the new version of the vector map to the autonomous vehicle, wherein the second map parcel is flagged as non-operational for the autonomous vehicle.

10. The vector map processing system of claim 9, wherein the at least one processor is further configured to suppress an area that includes the second map parcel, including the proposed vector map content change, during the publishing of the new version of the vector map.

11. The vector map processing system of claim 10, wherein the at least one processor is further configured to add the suppressed area to a list of suppressed areas for the new version of the vector map.

12. The vector map processing system of claim 9, wherein the vector map features comprise any of: streets, buildings, stop signs or traffic signals.

13. The vector map processing system of claim 9, wherein the validation indication further comprises a valid or invalid status.

14. A method of publishing a vector map comprising:
defining features in one or more areas of the vector map, wherein the features are associated with traffic control measures to direct operations of an autonomous vehicle;
receiving a proposed vector map content change to the features on the vector map;
testing the proposed vector map content change against a vector map policy, wherein the vector map policy is represented by rules defining functional principles of the traffic control measures of the vector map content change;
receiving an indication that the proposed vector map content change fails the testing;
determining that a user acknowledgement was not received for the failed testing;
publishing, based on the user acknowledgement not being received for the failed testing, a new version of the vector map by suppressing an area of the vector map where the vector map content change is located; and
communicating the new version of the vector map to the autonomous vehicle, wherein the suppressed area is non-operational for the autonomous vehicle.

* * * * *